(12) United States Patent
Parikh

(10) Patent No.: US 11,829,449 B2
(45) Date of Patent: Nov. 28, 2023

(54) INTERMEDIATE INPUT FOR MACHINE LEARNED MODEL

(71) Applicant: Zoox, Inc., Foster City, CA (US)

(72) Inventor: Samir Parikh, Los Gatos, CA (US)

(73) Assignee: Zoox, Inc., Foster City, CA (US)

( * ) Notice: Subject to any disclaimer, the term of this patent is extended or adjusted under 35 U.S.C. 154(b) by 282 days.

(21) Appl. No.: 17/137,873

(22) Filed: Dec. 30, 2020

(65) Prior Publication Data
US 2022/0207308 A1    Jun. 30, 2022

(51) Int. Cl.
| | |
|---|---|
| G06F 18/00 | (2023.01) |
| G06F 18/2415 | (2023.01) |
| G05D 1/02 | (2020.01) |
| G06N 3/08 | (2023.01) |
| G06N 3/04 | (2023.01) |
| G06V 10/40 | (2022.01) |
| G06V 20/56 | (2022.01) |

(52) U.S. Cl.
CPC ......... *G06F 18/2415* (2023.01); *G05D 1/021* (2013.01); *G06N 3/04* (2013.01); *G06N 3/08* (2013.01); *G06V 10/40* (2022.01); *G06V 20/56* (2022.01)

(58) Field of Classification Search
CPC combination set(s) only.
See application file for complete search history.

(56) References Cited

U.S. PATENT DOCUMENTS

| | | | |
|---|---|---|---|
| 10,825,188 | B1 * | 11/2020 | Tan ........................... G06T 7/11 |
| 2018/0349746 | A1 | 12/2018 | Vallespi-Gonzalez |
| 2019/0034762 | A1 | 1/2019 | Hashimoto |
| 2019/0236414 | A1 | 8/2019 | Totolos, Jr. et al. |
| 2020/0401823 | A1 * | 12/2020 | Miller ...................... G06N 3/08 |

(Continued)

OTHER PUBLICATIONS

Liang et al, Multi-Task Multi-Sensor Fusion for 3D Object Detection, Proceedings of the IEEE/CVF Conference on Computer Vision and Pattern Recognition (CVPR), pp. 7345-7353 (Year: 2019).*

(Continued)

*Primary Examiner* — Nay A Maung
*Assistant Examiner* — Xiao Liu
(74) *Attorney, Agent, or Firm* — Lee & Hayes, P.C.

(57) ABSTRACT

Techniques for determining a classification probability of an object in an environment are discussed herein. Techniques may include analyzing sensor data associated with an environment from a perspective, such as a top-down perspective, using multi-channel data. From this perspective, techniques may determine channels of multi-channel input data and additional feature data. Channels corresponding to spatial features may be included in the multi-channel input data and data corresponding to non-spatial features may be included in the additional feature data. The multi-channel input data may be input to a first portion of a machine-learned (ML) model, and the additional feature data may be concatenated with intermediate output data from the first portion of the ML model, and input into a second portion of the ML model for subsequent processing and to determine the classification probabilities. Additionally, techniques may be performed on a multi-resolution voxel space representing the environment.

20 Claims, 7 Drawing Sheets

(56) References Cited

U.S. PATENT DOCUMENTS

| | | | |
|---|---|---|---|
| 2021/0150230 A1* | 5/2021 | Smolyanskiy | G06V 10/803 |
| 2022/0035376 A1* | 2/2022 | Laddah | G06K 9/6289 |
| 2022/0157161 A1* | 5/2022 | Tan | G06F 18/2415 |
| 2022/0207275 A1 | 6/2022 | Parikh | |

OTHER PUBLICATIONS

International Search Report and Written Opinion for PCT Application No. PCT/US21/62122, dated Mar. 17, 2022, 6 pgs.

\* cited by examiner

240 ⇾

250 ⇾

260 ⇾

INTERMEDIATE INPUT FOR MACHINE LEARNED MODEL

BACKGROUND

Autonomous vehicles may use sensors to capture data representing objects in an environment. Techniques can be used to determine classifications of such objects. Current techniques often involve processing substantial input data, which may present challenges in resource-constrained environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
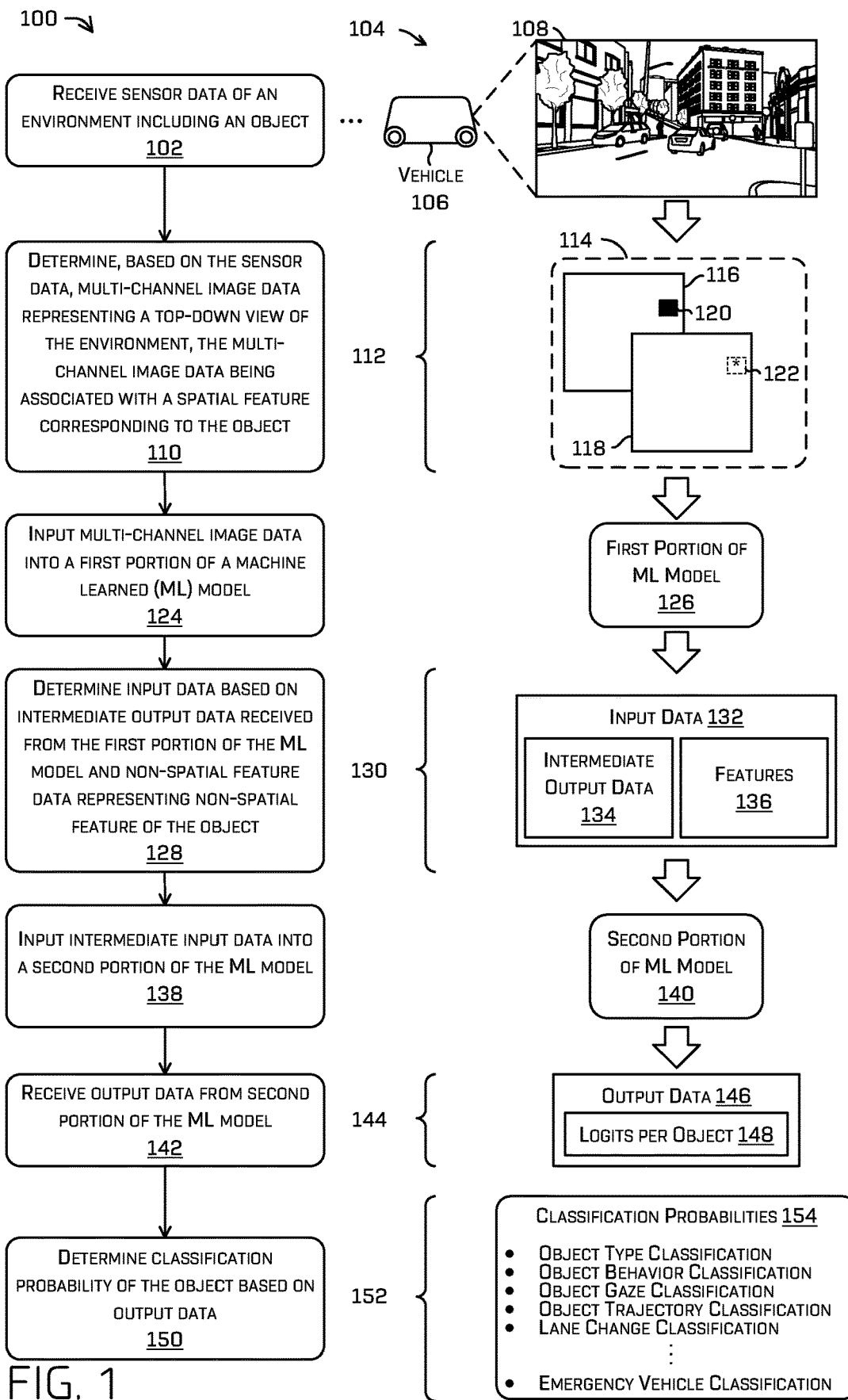
FIG. 1 is a pictorial flow diagram of an example process of receiving sensor data of an environment, inputting input data into a first portion of a machine-learned (ML) model, inputting intermediate input data into a second portion of the ML model, and determining a classification probability of an object in the environment based on the output data from the first and second portion of the ML model.

Techniques for processing sensor data to determine classifications associated with an object in an environment are discussed herein. For example, techniques may include generating, based on the sensor data, environment data representing an environment. For example, such environment data can be represented as multi-channel image data, which may represent a top-down view of the environment. The sensor data may include data associated with an environment where, in some examples, one or more object(s) (e.g., pedestrians, vehicles, bicyclists, etc.) may reside. The sensor data (or data based on sensor data) may comprise feature data representing spatial attributes (e.g., map information, occupancy layers, etc.) associated with the object and/or non-spatial attributes (e.g., velocity, acceleration, vehicle lights, etc.) associated with the object. The techniques described herein may include, but are not limited to, receiving the sensor data, viewing the sensor data (or data based on sensor data) as multi-channel image data from a "top-down view," determining feature data associated with an object represented in the input data, inputting the input data into a first portion of a machine-learned (ML) model, determining intermediate input data based on concatenating intermediate output data received from the first portion of the ML model with the feature data, inputting the intermediate input data into a second portion of the ML model, and determining classification probabilities associated with the object based on the output data received from the second portion of the ML model.

Additionally, or alternatively, the techniques described herein, such as, for example, a process for processing multi-channel image data with a machine-learned processing pipeline by inputting a first subset of layers of the image data at a first portion of the pipeline and a second subset of layers of the image data at a second portion of the pipeline, may be performed a number of times, in parallel, corresponding to a number of renders of an environment as multi-channel image data.

For example, a first portion of an environment can be rendered as first multi-channel image data (e.g., top-down multi-channel image data) associated with a first range (e.g., 50 m×50 m). A second portion of the environment (e.g., a 100 m×100 m area) can be rendered as second multi-channel image data associated with a second range. A third portion of the environment (e.g., 200 m×200 m) can be rendered as third multi-channel image. Any number areas of the environment can be represented as multi-channel image data. In some examples, the multi-channel image data can represent at least partially overlapping portions of the environment. In some examples, the different multi-channel image data can be centered around a common point. In some examples, each of the input data can be associated with a same "resolution."

The input data can be input in parallel to different machine learned models to determine classification information for "pixels" or objects represented by the input data. Outputs associated with overlapping portions of the environment can be aggregated to determine a classification for object represented in multiple input data. The classification probabilities may be passed to other components and may be utilized in generating inferences, to determine a trajectory of the vehicle, and the like.

This separation of processing pipelines for each of the different ranges of the environment represented by multi-channel image data avoids processing restraints that may arise in processing all of the different ranges with a single pipeline. In some examples, increasing the range represented by the image data and using a same resolution would increase processing and space requirements proportionally to the increase in range. For example, first multi-channel image data associated with a first range (e.g., 50 m×50 m) at a first resolution (e.g., roughly 10 cm per pixel) may be rendered and processed at substantially similar rates as second multi-channel image data associated with a second range (e.g., 100 m×100 m) at a second resolution (e.g., roughly 40 cm per pixel), as a substantially similar number of pixels are being processed while the range is being increased. While the larger second range has a coarser resolution than the shorter first range, the first range may provide an acceptable resolution to identify objects close to the vehicle that require finer resolution pixels for processing, yielding more accurate classification results. Additionally, configuring separate processing pipelines to run in parallel and then aggregating the resulting data may further improve the rendering and/or processing times.

As noted above, sensor data may be represented as multi-channel image data associated with various portions of an environment. Feature data may be determined for a region of the environment. For example, feature data may include a plurality of spatial features and non-spatial features. In some examples, the spatial features may include, but are not limited to, map information of an environment (e.g., lane markings, crosswalks, locations of traffic lights, building locations, etc.), a bounding box of an object in an environment, a size of an object in an environment, and the like. Additionally, or alternatively, the non-spatial features may include, but are not limited to, a velocity of an object in an environment, an acceleration of an object in an environment, a lighting state associated with lights of an object in an environment, an object behavior class (e.g., aggressive, normal, etc.) and the like. In some examples, one or more features associated with the environment may be encoded or otherwise stored as a layer of multi-channel image data (e.g., a multi-channel input image). Thus, the data may be efficiently represented for input to the machine learned model.

For example, the machine learned model may accept data in the form of a top-down multi-channel input image. Particularly, the model accepts data in the form of an image of size equal to the number of X and Y discretizations of the environment, the image having a number of channels representing different spatial features of the environment.

In some examples, the multi-channel input data may include one or more layer(s) of image data. For example, the multi-channel image data can include a first two-dimensional layer (e.g., first channel) associated with first feature data and a second two-dimensional layer (e.g., second channel) associated with second feature data. Additionally, or alternatively, the multi-dimensional image data can include a group of two-dimensional layers, such as the first channel and the second channel associated with feature data representing a single feature.

In some examples, the multi-dimensional image data can comprise layers associated with multiple classes of semantic information, although in some examples, data associated with certain classifications can be omitted from the multi-channel image data.

In some examples, a variety of sensor data may be associated with the multi-channel image data. For example, in some examples, the multi-channel image data may represent lidar data, radar data, time-of-flight data, or any other depth data.

In some examples, the techniques discussed herein may be implemented in the context of a vehicle, such as an autonomous vehicle. The autonomous vehicle may capture sensor data as the vehicle traverses an environment and may determine multi-channel image data.

As noted above, techniques may include performing operations based on data associated with an environment, a single-resolution multi-channel image data, and/or a multi-resolution multi-channel image data. With a first portion of the sensor data represented by multi-channel image data, and feature data determined from a second portion of the sensor data (wherein the portions may overlap at least partially), operations may include inputting the multi-channel image data into a first portion of an ML model to process the multi-channel image data and receive intermediate output data. In some examples, the multi-channel image data may represent a top-down view of the environment. Additionally, or alternatively, the multi-channel image data may represent a spatial feature and/or an object in the environment. In some examples, the intermediate output data may represent dense features associated with the sensor data extracted from the multi-channel image data. Additionally, or alternatively, the operations may include determining intermediate input data based on the intermediate output data and the feature data and inputting the intermediate input data into a second portion of the ML model to process the intermediate input data and receive output data. In some examples, the output data may represent a plurality of logits (e.g., a function that represents probability values from 0, or negative infinity, to 1, or infinity) per object in the environment represented by the multi-channel image data. Additionally, or alternatively, the operations may further include determining one or more classification probabilities of an object based on the output data.

It should be noted that any of the input data and output data discussed herein may be represented by any data structure capable of storing feature data, such as, for example, a tensor (e.g., a number, a scalar, an array, a vector, a 2d-array, a matrix, etc.)

In some examples, a first renderer may be configured to generate the multi-channel input data, which may be configured as multi-channel image data comprising N-channels, where N may be any integer corresponding to a number of features associated with the sensor data. The N-channels of the multi-channel image data may then be split into two subsets of channels based on the feature data. For example, the N-channels may be split into first A-channels, where A may be any integer corresponding to a number of primary features, such as, for example, spatial features, represented by the feature data, and second B-channels, where B may be any integer corresponding to a number of secondary features, such as, for example, non-spatial features, represented by the feature data, per entity in the environment. The N-channels of the multi-channel image data may then be processed by the system at different points in, and by different portions of, an ML model. For example, input data comprising the first A-channels may be input into a first portion of an ML model, where the data representing the first A-channels may be transformed, such that, all of the features associated with pixels that correspond to an object (or entity) in the environment may be aggregated to represent the all of the features for the given object. These A-channels, once represented as per-object features, may then be combined with the B-channels including the non-spatial features represented by the feature data per entity later in the processing pipeline.

This separation between the A-channels and the B-channels of the N-channel input image data results in quicker execution of the ML classification pipeline, as only the first A-channels are input into a dense backbone portion of the pipeline, with a smaller footprint, as a result of a lower power cost requirement for execution. Additionally, as spatially processing everything included in the multi-channel input data with a dense neural network results in a proportional increase in weights corresponding to the number of channels, reducing the number of channels being input into the dense network from N-channels to a first A-channels (where A is a subset of N) may result in a significant reduction in inference time, proportional to the reduction in the number of channels.

In some examples, the first portion of the ML model may be configured as a backbone, or a feature extraction component, of a neural network, such as, for example, a Convolutional Neural Network (CNN). Example backbones may include, but are not limited to, ResNet101, ResNet52, and the like. The first portion of the ML model may process the multi-channel image data comprising the first A-channels and determine intermediate output data corresponding to the multi-channel image data. For example, the intermediate output data may include a dense representation (or a collection of values) of the features associated with the first A-channels. In some examples, the dense representation of the features may comprise a feature vector associated with a pixel represented in the multi-channel image data.

In some examples, a second renderer, configured as a sparse renderer, may be configured to generate additional feature data based on the sensor data corresponding to specific features, such as, for example, the second B-channels representing the non-spatial features. The additional feature data may comprise a plurality of features per object represented by the sensor data. In some examples, the additional feature data may be configured as a feature vector associated with an object.

In some examples, intermediate input data may be determined, based on concatenating the intermediate output data and the additional feature data, per object. For example, a single-channel image may be utilized to mask to the intermediate output data and detect one or more objects and/or determine one or more graphical references corresponding to a specific location, such as a central location, for example, of the one or more objects within the multi-channel image data. In some examples, the first renderer may generate the single-channel image including an indication of a center of an object (or respective centers of each object) included in the image. The single-channel image may also include indications of occupancy associated with the object in the environment. For example, the single-channel image may be aligned with, or otherwise mask, the intermediate output data, to provide an indication of occupancy and/or a graphical reference corresponding to a corresponding location of the object with respect to the intermediate output data. Wherever there is not an indication of occupancy in the intermediate output data, the corresponding feature vector may be ignored, and wherever there is an indication of occupancy in the intermediate output data, the corresponding feature vector may be collected. The collected feature vectors corresponding to a single object may be aggregated to determine a single feature vector associated with the object, and the single feature vector may be represented at the graphical reference corresponding to a corresponding location of the object within the multi-channel image data. Additionally, the feature vector represented at the graphical reference may be concatenated with the additional features per object (i.e., concatenating the feature vector associated with the object with the additional feature vector associated with the object) to determine the intermediate input data.

The intermediate input data may be input into a second portion of the ML model. In some examples, the second portion of the ML model may be configured as a dense neural network, such as, for example, a Deep Neural Network (DNN). The intermediate input data may be passed through the second portion of the ML model, per object in the environment, which may process the intermediate input data and determine output data representing a plurality of logits (e.g., a function that represents probability values from 0, or negative infinity, to 1, or infinity) per object in the environment.

In some examples, one or more classification probabilities of an object in the environment may be determined based on the output data. For example, the logits may indicate a plurality of probabilities associated with a plurality of classifications associated with an object, such as, but not limited to, an object type classification (e.g., vehicle, pedestrian, bicycle, etc.), an object behavior classification (e.g., assertive, normal, evasive, aggressive, etc.), an object gaze classification (e.g., a distracted pedestrian, an alert pedestrian, etc.), an object trajectory classification (e.g., on road, remaining on sidewalk, jaywalking, etc.), a lane change classification (e.g., changing lanes into my lane), and/or an emergency vehicle classification. These classification probabilities are mere examples and the techniques are not limited to these specific examples.

The techniques discussed herein may improve a functioning of a computing device, such as a computing device of an autonomous vehicle, in a number of ways. For example, using multiple levels in the multi-resolution multi-channel image data facilitates high resolution management of data near a vehicle and lower resolution management of data further away from a vehicle. Such levels may significantly reduce an amount of memory for storing sensor data, for example, when compared to a input data associated with a single, high resolution level. In some examples, complex spatial and semantic data can be represented visually in multi-channel image data, allowing for efficient evaluation and processing of the data. The techniques described herein may also reduce latency for top-down predictions. As may be understood, reducing latency of top-down predictions at an increased range may improve safety outcomes, particularly in the context of vehicles and autonomous vehicles. The techniques described herein may also improve safety outcomes by reducing the processing time of detecting and classifying objects, and also detecting and classifying objects at a further range. As may be understood, in the context of vehicles and autonomous vehicles, situations may arise where determination and detection of objects must occur quickly and accurately. Additionally, situations may arise where determination and detection of objects at a greater range must also occur quickly and accurately. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of receiving sensor data, of an environment, inputting input data into a first portion of a machine-learned (ML) model, inputting intermediate input data into a second portion of the ML model, and determining a classification probability of an object in the environment based on the output data from the first and second portion of the ML model.

At operation 102, the process may include receiving, by sensors operating in connection with a perception system of a vehicle (e.g., autonomous vehicle), sensor data of an environment and semantic information associated with the sensor data. Although discussed in the context of sensor data, the operation 102 can include receiving any three-dimensional data or data comprising a depth component. The semantic information can include, for example, one or more semantic classification(s), label(s), or segmentation information. In some instances, the operation 102 can include receiving a plurality of sensor datasets from a plurality of sensors operating in connection with the perception system. In some instances, the operation 102 can include combining or fusing data from two or more sensors (and/or over a period of time) into a single lidar dataset (also referred to as a "meta spin"). In some instances, the operation 102 can include extracting a portion of the sensor data for processing, such as over a period of time. In some instances, the operation 102 can include receiving radar data (or other sensor data) and associating the radar data with the sensor data to generate a more detailed representation of an environment.

As noted above, the sensor data (e.g., sensor dataset(s)) can be associated with semantic information. An example of such techniques for determining and associating the sensor data with the semantic information are discussed in, for example, in U.S. patent application Ser. No. 15/820,245 titled "Sensor Data Segmentation" and filed Nov. 21, 2017, which is incorporated by reference herein in its entirety.

The semantic information may be associated with static and/or dynamic objects in the environment for classification and/or trajectory planning. Portions of the environment corresponding to a ground, static objects, and/or dynamic objects can be identified and labeled with such semantic information. In some examples, data can be segmented based at least in part on the semantic information. In some instances, a list of dynamic objects can be provided to a tracking system to track and/or predict a trajectory of each dynamic object over time. In some instances, a list of static objects and/or an identification of the ground can be provided to a planner system to generate a trajectory for the vehicle that traverses a drivable surface and avoids or otherwise accounts for the static objects identified herein.

An example 104 illustrates a vehicle 106 capturing sensor data 108 of an environment. In some examples, the sensor data 108 may comprise lidar data, radar data, sonar data, time-of-flight data, or other depth data. For example, the operation 102 may include capturing image data and generating depth data based on the captured image data.

At operation 110, the process may include determining multi-channel image data 114 (e.g., a two-dimensional input grid) representing a top-down view of the environment. In some examples, the multi-channel image data 114 may be determined based on the sensor data.

As previously mentioned, in some examples, the operation 110 may include determining multi-channel image data (e.g., a two-dimensional input grid) 114 based on the various portions of the environment. Each region or portion of the multi-channel image data 114 may be determined as a region of a two-dimensional representation associated with a region (or other dimension) of the environment. In some examples, each region of the multi-channel image data 114 may be a cell of the two-dimensional representation associated with the region of the environment. Each region of the two-dimensional input grid may be associated with a 50 centimeter×50 centimeter region and may include feature data. Each region may be associated with (e.g., positioned adjacent to) one or more adjacent (e.g., neighbor) regions.

An example of multi-channel image data 114 is illustrated in an example 112. For example, the example 112 comprises a first channel 116 and a second channel 118. In some examples, the first channel 116 may represent a bounding box, location, extent (e.g., length and width), and/or any other indication of the presence of an object 120 in the environment. In some examples, the second channel 118 may represent feature data comprising a spatial feature 122 (e.g., map information, occupancy layers, etc.) associated with the object.

The multi-channel image data may include a plurality of regions. Each of the regions may be determined as the region of the two-dimensional representation and may be associated with a region of the environment. For example, a region may be associated with a region of an environment, based on three-dimensional information associated with the environment being converted to two-dimensional information associated with the region.

Each of the regions may include feature data. By way of example and without limitation, the feature data can include (for sensor data associated with a column) a plurality of spatial features 122 and non-spatial features. In some examples, the spatial features 122 may include, but are not limited to, map information of an environment (e.g., lane markings, crosswalks, locations of traffic lights, building locations, etc.), a bounding box of an object in an environment, a size of an object in an environment, and the like. Additionally, or alternatively, the non-spatial features may include, but are not limited to, a velocity of an object in an environment, an acceleration of an object in an environment, a lighting state associated with lights of an object in an environment, an object behavior class (e.g., aggressive, normal, etc.) and the like. In some examples, one or more features associated with the sensor data and/or the three-dimensional voxel space may be encoded or otherwise stored as a layer of a multi-channel input image. Thus, the data may be efficiently represented for input to the machine learned model.

In some examples, a first renderer may be configured to generate the multi-channel input data 114, which may be configured as multi-channel image data 114 comprising N-channels, where N may be any integer corresponding to a number of features associated with the sensor data. The N-channels of the multi-channel image data 114 may then be split into two subsets of channels based on the feature data. For example, the N-channels may be split into first A-channels, where A may be any integer corresponding to a number of spatial features represented by the feature data, and second B-channels, where B may be any integer corresponding to a number of non-spatial features represented by the feature data. The N-channels of the multi-channel image data 114 may then be processed by the system at different points in, and by different portions of, an ML model. For example, input data comprising the first A-channels may be input into a first portion of an ML model.

As can be understood, the operation 110 can include generating or determining the multi-channel image(s), as discussed herein. Examples of generating or determining multi-channel image(s) are discussed in connection with U.S. patent application Ser. No. 16/151,607, entitled "Trajectory Prediction on Top-Down Scenes," and filed Oct. 4, 2018. application Ser. No. 16/151,607 is herein incorporated by reference, in its entirety.

The operation 124 may include inputting the multi-channel image data 114 (e.g., top-down or another view) into a first portion of an ML model 126 configured as a backbone, or a feature extraction component, of a neural network, such as, for example, a Convolutional Neural Network (CNN). Example backbones may include, but are not limited to, ResNet101, ResNet52, and the like. The first portion of the ML model 126 may process the multi-channel image data 114 comprising the first A-channels and determine intermediate output data corresponding to the multi-channel image data 114.

The operation 128 may include determining intermediate input data to be input into a second portion of the ML model. In some examples, determining the intermediate input data may be based on concatenating intermediate output data and additional feature data, per object in the environment.

In some examples, the operation 128 may include utilizing a second renderer, such as a sparse renderer, configured to generate additional feature data based on the sensor data 108 corresponding to specific features, such as, for example, the second B-channels representing the non-spatial features.

An example of the intermediate input data is illustrated in example 130. In some instances, the example 130 may comprise the intermediate input data 132 determined based on the intermediate output data 134 and the additional feature data (or features) 136.

In some examples, the intermediate output data 134 may include a dense representation (or a collection of values) of the features associated with the first A-channels. In some examples, the dense representation of the features may comprise a feature vector associated with a pixel represented in the multi-channel image data 114.

In some examples, the additional feature data 136 may be based on the sensor data 108 corresponding to specific features, such as, non-spatial features. The additional feature data 136 may comprise a plurality of features per object represented by the sensor data 108. In some examples, the additional feature data 136 may be configured as a feature vector associated with an object 120.

In some examples, the intermediate input data 132 may be determined, based on concatenating the intermediate output data 134 and the additional feature data 136, per object. For example, a single-channel image may be utilized to mask to the intermediate output data 134 and detect one or more objects. In some examples, the first renderer may generate the single-channel image including an indication of a center of an object (or respective centers of each object) included in the image. The single-channel image may also include indications of occupancy associated with the object 120 in the environment. For example, the single-channel image may be aligned with, or otherwise mask, the intermediate output data 134, to provide an indication of occupancy with respect to the intermediate output data 134. Wherever there is not an indication of occupancy in the intermediate output data 134, the corresponding feature vector may be ignored, and wherever there is an indication of occupancy in the intermediate output data 134, the corresponding feature vector may be collected. The collected feature vectors corresponding to a single object may be aggregated to determine a single feature vector associated with the object 120, and the single feature vector may be represented at the center of the object.

Additionally, the feature vector represented at a graphical reference, such as, for example, the center of the object 120 may be concatenated with the additional features per object 136 (i.e., concatenating the feature vector associated with the object with the additional feature vector associated with the object) to determine the intermediate input data 132.

The operation 138 may include inputting the intermediate input data 132 into a second portion of the ML model 140 configured as a dense neural network, such as, for example, a Deep Neural Network (DNN). The intermediate input data 132 may be passed through the second portion of the ML model, per object in the environment, which may process the intermediate input data 132 and determine output data representing a plurality of logits (e.g., a function that represents probability values from 0, or negative infinity, to 1, or infinity) per object in the environment.

The operation 142 may include receiving output data from the second portion of the ML model 140. An example of the output data is illustrated in example 144. In some instances, the example 144 may comprise the output data 146 representing a plurality of logits (e.g., a function that represents probability values from 0, or negative infinity, to 1, or infinity) per object 148 in the environment.

The operation 150 may include determining one or more classification probabilities of the object. In some examples, determining the one or more classification probabilities may be based at least in part on the logits per object 148 represented by the output data 146.

An example of the classification probabilities is illustrated in example 152. In some instances, the example 152 may comprise the classification probabilities 154 of the object 120 in the environment. As previously mentioned, the classification probabilities 154 may be based at least in part on the logits per object 148 represented by the output data 146.

For example, the logits per object 148 may indicate one or more classification probabilities 154 determined as a plurality of probabilities associated with a plurality of classifications associated with the object 120, such as, but not limited to, an object type classification (e.g., vehicle, pedestrian, bicycle, etc.), an object behavior classification (e.g., assertive, normal, evasive, aggressive, etc.), an object gaze classification (e.g., a distracted pedestrian, an alert pedestrian, etc.), an object trajectory classification (e.g., on road, remaining on sidewalk, jaywalking, etc.), a lane change classification (e.g., changing lanes into my lane), and/or an emergency vehicle classification.

Additionally, or alternatively, at operation 150, the process may include controlling a vehicle 106 based at least in part on processing the classification probabilities 154. In some examples, the operation 150 may be performed by the vehicle 106. In some examples, the operation 150 may include generating a route, trajectory, and/or control signals for one or more systems of the vehicle 106 to navigate the vehicle 106 within the environment.

FIG. 2 depicts an example 200 of a multi-resolution voxel space 202 and multi-channel image data associated with the voxel space. In some examples, the multi-resolution voxel space 202 may correspond to the example voxel space previously described with respect to FIG. 1.

The multi-resolution voxel space 202 is illustrated in three dimensions (e.g., x, y, z) and includes the first level 204, the second level 206, and the third level 208.

A two-dimensional representation (e.g., illustrating the x-y aspect of the first level 204) is illustrated as a first level 210.

A two-dimensional representation (e.g., illustrating the x-y aspect of the second level 206) is illustrated as a second level 212.

A two-dimensional representation (e.g., illustrating the x-y aspect of the third level 208) is illustrated as a third level 214.

An example 216 depicts the levels 210, 212, and 214 (or the levels 204, 206, and 208) collocated with respect to the vehicle 218. That is, the voxel levels 210, 212, and 214 can correspond to a portion of an environment proximate the vehicle 218.

As can be seen by the example 216, some portions of a multiresolution voxel space can be associated with one level, two levels, three levels, or any number of levels. For example, a point 220 can be associated with the first level 210. A point 222 can be associated with the first level 210 and the second level 212. That is, the point 222 can be represented in a first voxel associated with the first level 210 and a second voxel associated with the second level 212, where the first voxel and the second voxel at least partially overlap. A point 224 can be associated with the first level 210, the second level 212, and the third level 214. That is, the point 224 can be represented in a first voxel associated with the first level 210, a second voxel associated with the second level 212, and a third voxel associated with the third level 214, where the first voxel, the second voxel, and the third voxel at least partially overlap.

Additionally, or alternatively, each of the levels 210, 212, and 214 may be utilized to determine corresponding multi-channel image data, such as multi-channel image data representing a top down view of each of the levels, 210, 212, and 214, for input to the first portion of the ML model 126 for processing in accordance with the process 100 described as described above with respect to FIG. 1, configured for the resolution of the corresponding level. In some examples, each of the multi-channel input images corresponding to the levels 210, 212, and 214, respectively, may be processed in parallel, or any number of levels corresponding to a number of voxel spaces included in a multi-resolution voxel space 202, and the output data may be aggregated to determine the classification probabilities for an object. For example, the logits per entity corresponding to the multi-channel image data representing a top-down view of the coarsest resolution level 210, expanding a first and furthest range, may be stored. Additionally, the logits per entity corresponding to the multi-channel image data representing a top-down view of the intermediate resolution level 212, expanding a second and intermediate range, may be stored, and may overwrite a portion of the logits per entity corresponding to the multi-channel image data representing a top-down view of the coarsest resolution level 210 out to the second and intermediate range. Additionally, the logits per entity corresponding to the multi-channel image data representing a top-down view of the finest resolution level 214, expanding a third and shortest range, may be stored, and may overwrite a portion of the logits per entity corresponding to the multi-channel image data representing a top-down view of the intermediate resolution level 212 and/or the multi-channel image data representing a top-down view of the coarsest resolution level 210 out to the third and shortest range.

In some examples, operations can include accumulating data in each voxel independently of other voxels and/or voxel levels. That is, sensor data may be represented in a voxel space as raw sensor data (e.g., with individual <x, y, z, range, time, etc.> values associated with data points) or may be represented as a statistical accumulation of data. For example, sensor data may be accumulated in the voxel space, with an individual voxel including processed data, such a number of data points, an average intensity, an average x-value of sensor data associated with the individual voxel, an average-y value of the sensor data associated with the individual voxel, an average z-value of the sensor data associated with the individual voxel, and/or a covariance matrix based on the sensor data associated with the voxel. Sensor data can be accumulated independently for each voxel, even in the case where a voxel of one level at least partially overlaps a voxel of another level.

Additionally, or alternatively, sensor data may be represented as multi-channel image data associated with various portions of an environment. Feature data may be determined for a region of the environment.

As previously mentioned, sensor data may be accumulated in the voxel space and/or associated with various portions of an environment, with an individual voxel and/or portion including feature data representing features 226, such as, for example, (for sensor data associated with a column) a plurality of spatial features 228 and non-spatial features 230. In some examples, the spatial features 228 may include, but are not limited to, map information of an environment (e.g., lane markings, crosswalks, locations of traffic lights, building locations, etc.), a bounding box of an object in an environment, a size of an object in an environment, and the like. Additionally, or alternatively, the non-spatial features 230 may include, but are not limited to, a velocity of an object in an environment, an acceleration of an object in an environment, a lighting state associated with lights of an object in an environment, an object behavior class (e.g., aggressive, normal, etc.) and the like. In some examples, one or more features 226 associated with the sensor data and/or the three-dimensional voxel space may be encoded or otherwise stored as a layer of a multi-channel input image. Thus, the data may be efficiently represented for input to the machine learned model, such as the first portion of the ML model 126 as described with respect to FIG. 1.

In some examples, a renderer may be configured to generate multi-channel input data, comprising N-channels, where N may be any integer corresponding to the number of features 226 associated with the sensor data. The N-channels of the multi-channel image data may then be split into two subsets of channels based on the feature data 226. For example, the N-channels may be split into first A-channels, where A may be any integer corresponding to a number of spatial features 228 represented by the feature data 226, and second B-channels, where B may be any integer corresponding to a number of non-spatial features 230, represented by the feature data 226, per entity in the environment. The N-channels of the multi-channel image data may then be processed by the system at different points in, and by different portions of, an ML model. For example, input data comprising the first A-channels may be input into a first portion of an ML model, where the data representing the first A-channels may be transformed, such that, all of the features associated with pixels that correspond to an object (or entity) in the environment may be aggregated to represent the all of the features 226 for the given object. These A-channels, once represented as per-object features, may then be combined with the B-channels including the non-spatial features 130 represented by the feature data per entity later in the processing pipeline.

This separation between the A-channels and the B-channels of the N-channel input image data results in quicker execution of the ML classification pipeline, as only the first A-channels are input into a dense backbone portion of the pipeline, with a smaller footprint, as a result of a lower power cost requirement for execution. Additionally, as spatially processing everything included in the multi-channel input data with a dense neural network results in a proportional increase in weights corresponding to the number of channels, reducing the number of channels being input into the dense network from N-channels to a first A-channels (where A is a subset of N) may result in a significant reduction in inference time, proportional to the reduction in the number of channels.

Figure 2A:
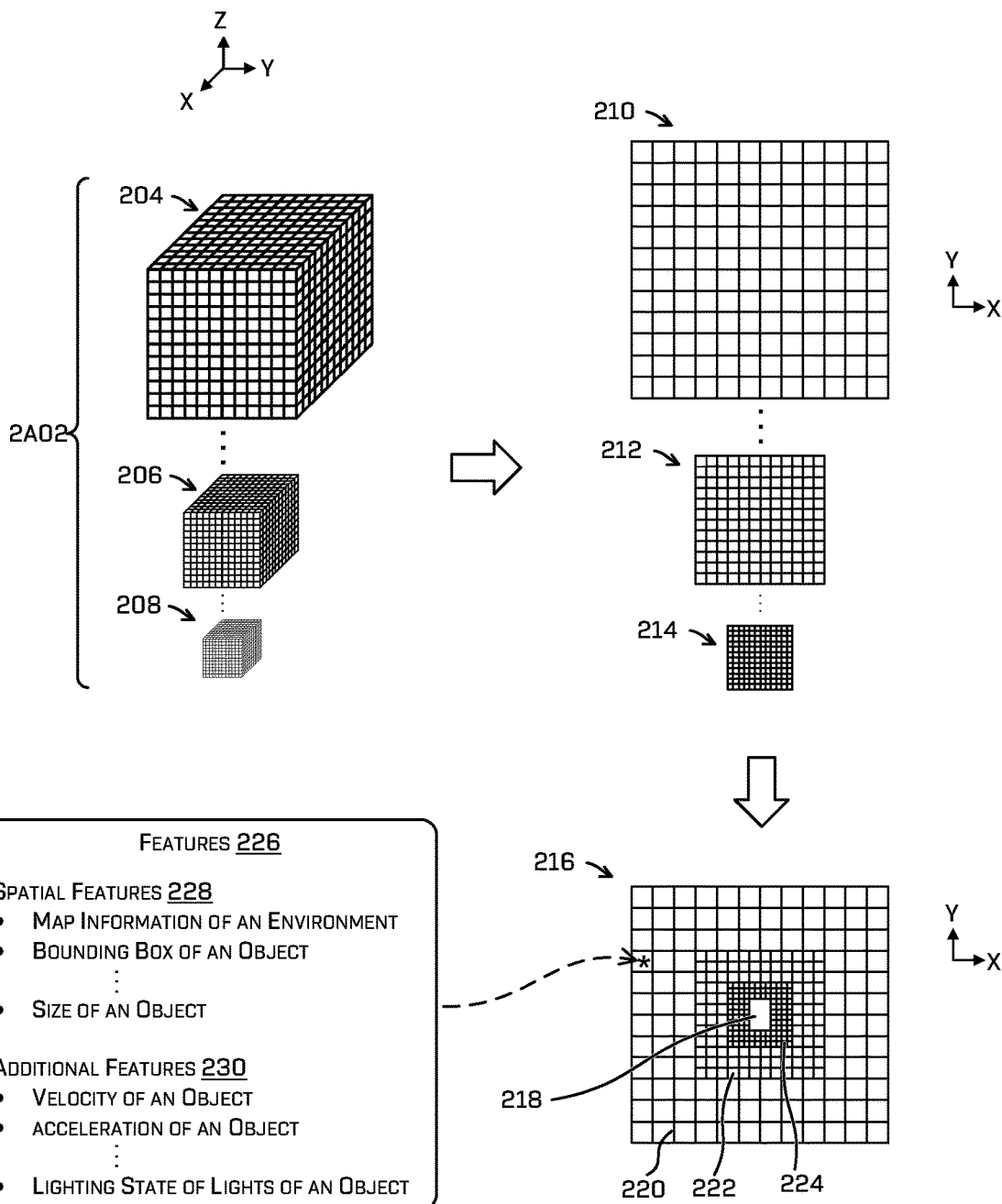
FIG. 2A depicts an example of a multi-resolution voxel space and multi-channel image data associated with the voxel space.
Figure 2B:
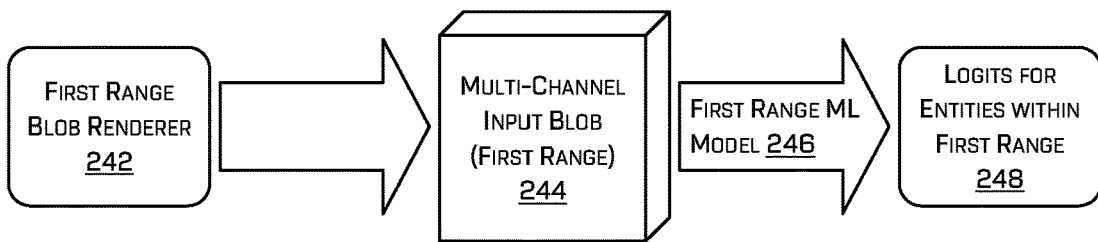
FIG. 2B depicts example processing pipelines for processing various extents of an environment that may be rendered at different resolutions.
Figure 2B:
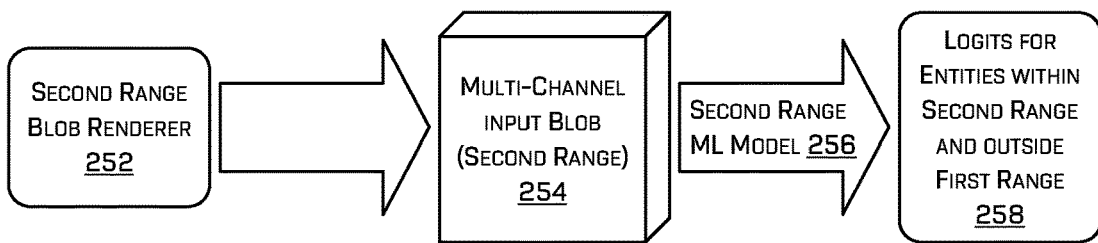
Figure 2B:
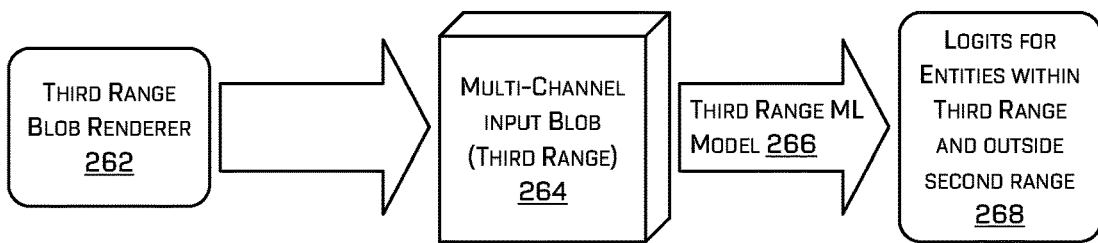

FIG. 2B depicts example processing pipelines 240, 250, and 260 for processing various extents of an environment that may be rendered at different resolutions. In some examples, the input blobs 244, 254, and 264 may correspond to the multi-channel image data 114 previously described with respect to FIG. 1. In some examples, the processing pipelines 240, 250, and 260 may implement techniques corresponding to the process 100 previously described with respect to FIG. 1.

As previously described, techniques described herein may be performed a number of times, in parallel, corresponding to a number of renders of an environment as multi-channel image data. For example, a first range blob renderer 242 may render a first multi-channel input blob 244 representing a first portion of an environment as multi-channel image data (e.g., top down multi-channel image data) associated with a first range (e.g., 50 m×50 m). Additionally, or alternatively, a second range blob renderer 252 may render a second multi-channel input blob 254 representing a second portion of an environment as multi-channel image data (e.g., top down multi-channel image data) associated with a second range (e.g., 100 m×100 m). Additionally, or alternatively, a third range blob renderer 262 may render a third multi-channel input blob 264 representing a third portion of an environment as multi-channel image data (e.g., top down multi-channel image data) associated with a third range (e.g., 200 m×200 m).

In some examples, the multi-channel input blobs 244, 254, and 264 can represent at least partially overlapping portions of the environment. In some examples, the different multi-channel input blobs 244, 254, and 264 can be centered around a common point. The input blobs 244, 254, and 264 can be input in parallel to different machine learned models 246, 256, and 266, configured for various ranges, to determine classification information for "pixels" or objects represented by the input blobs 244, 254, and 264. Outputs associated with overlapping portions of the environment can be aggregated to determine a classification for object represented in multiple input blobs 244, 254, and 264.

In a first example processing pipeline 240, a first multi-channel input blob 244 may be input into a first range ML model 246 configured to process multi-channel input blobs 244 representing a portion of an environment associated with a first, shortest, range. The first range ML model 246 may determine output data representing a plurality of logits (e.g., a function that represents probability values from 0, or negative infinity, to 1, or infinity) for entities within the first range 248 of the environment.

In a second example processing pipeline 250, a second multi-channel input blob 254 may be input into a second range ML model 256 configured to process multi-channel input blobs 254 representing a portion of an environment associated with a second, intermediate, range. The second range ML model 256 may determine output data representing a plurality of logits (e.g., a function that represents probability values from 0, or negative infinity, to 1, or infinity) for entities within the second range 258 of the environment. Additionally, or alternatively, the second range ML model 256 may determine output data representing the logits for entities within the second range and outside of the first range 258.

In a third example processing pipeline 260, a third multi-channel input blob 264 may be input into a third range ML model 266 configured to process multi-channel input blobs 264 representing a portion of an environment associated with a third, longest, range. The third range ML model 266 may determine output data representing a plurality of logits (e.g., a function that represents probability values from 0, or negative infinity, to 1, or infinity) for entities within the third range 268 of the environment. Additionally, or alternatively, the third range ML model 266 may determine output data representing the logits for entities within the third range and outside of the second range 268.

In some examples, the output data representing the logits for entities within the various ranges 248, 258, and 268 determined by the ML models 246, 256, and 266, respectively, may be aggregated to determine classification probabilities for an object in the environment. For example, the logits for entities within the third range 268 may be collected first for the aggregation. The logits for entities within the second range 258 may be collected second and may overwrite a portion of the logits for entities within the third range 268 from a center point out to the second range. The logits for entities within the first range 248 may be collected third and may overwrite a portion of the logits per entity within the third range 268 and/or a portion of the logits per entity within the second range 258 from a center point out to the first range.

Thus, the output data may represent logits for entities within the first range 248, logits for entities within the second range and outside of the first range 258, and logits for entities within the third range and outside of the second range 268. In some examples, one or more classification probabilities of an object, in various extents of an environment that may be rendered at different resolutions, may be determined based on the output data. For example, the logits may indicate a plurality of probabilities associated with a plurality of classifications associated with an object, such as, but not limited to, an object type classification (e.g., vehicle, pedestrian, bicycle, etc.), an object behavior classification (e.g., assertive, normal, evasive, aggressive, etc.), an object gaze classification (e.g., a distracted pedestrian, an alert pedestrian, etc.), an object trajectory classification (e.g., on road, remaining on sidewalk, jaywalking, etc.), a lane change classification (e.g., changing lanes into my lane), and/or an emergency vehicle classification. These classification probabilities are mere examples and the techniques are not limited to these specific examples.

This separation of processing pipelines for each of the different ranges of the environment represented by multi-channel image data avoids processing restraints that may arise in processing all of the different ranges with a single pipeline. In some examples, increasing the range represented by the image data and using a same resolution would increase processing and space requirements proportionally to the increase in range. For example, first multi-channel image data associated with a first range (e.g., 50 m×50 m) at a first resolution (e.g., roughly 10 cm per pixel) may be rendered and processed at substantially similar rates as second multi-channel image data associated with a second range (e.g., 100 m×100 m) at a second resolution (e.g., roughly 40 cm per pixel), as a substantially similar number of pixels are being processed while the range is being increased. While the larger second range has a coarser resolution than the shorter first range, the first range may provide an acceptable resolution to identify objects close to the vehicle that require finer resolution pixels for processing, yielding more accurate classification results. Additionally, configuring separate processing pipelines to run in parallel and then aggregating the resulting data may further improve the rendering and/or processing times.

Figure 3A:
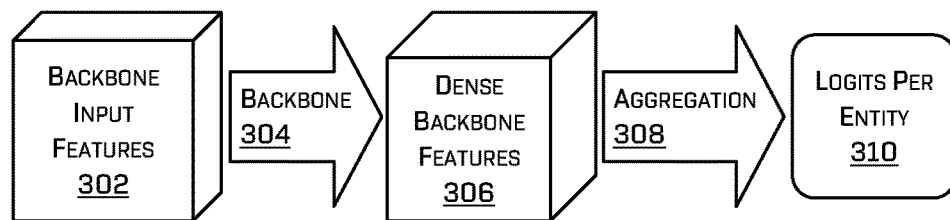
FIG. 3A depicts an example architecture of a system for processing the multi-channel image data with a ML model.

FIG. 3A depicts an example architecture 300 of a system for processing the multi-channel image data with a ML model.

As illustrated, backbone input features 302, such as multi-channel image data, may be input into a backbone 304, or a feature extraction component, of a neural network. The backbone 304 may be configured in various ways, such that, depending on the configuration of the backbone 304, the backbone input features 302 may be transformed into dense backbone features 306. In some examples, the dense backbone features 306 may comprise a dense representation (or a collection of values) of the features associated with the layers of the multi-channel image data. In some examples, the dense representation of the features may comprise a feature vector associated with a pixel represented in the backbone input features 302.

The dense backbone features 306, including the features vectors associated with respective pixels represented in the backbone input features 302, may be passed through an aggregation 308 component, which may aggregate all of the feature vectors of pixels which correspond to a single entity to determine a single feature vector associated with the entity. The feature vector associated with the entity may be further processed to determine a plurality of logits (e.g., a function that represents probability values from 0, or negative infinity, to 1, or infinity) per entity in the environment.

Figure 3B:
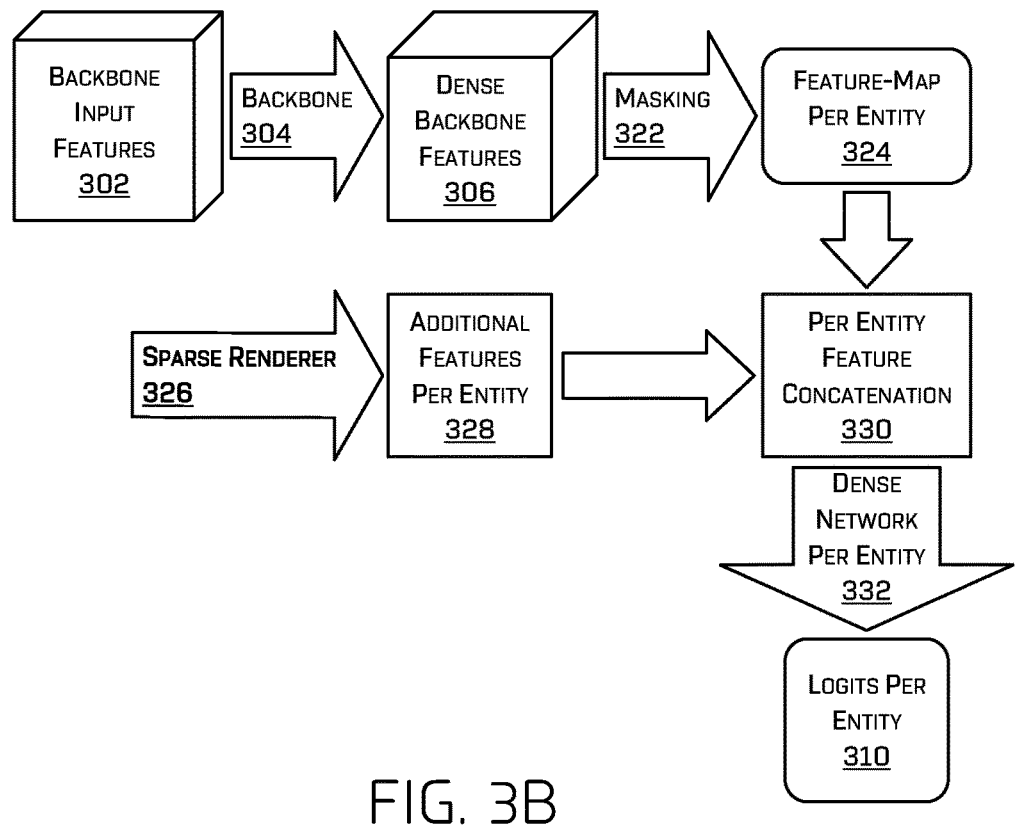
FIG. 3B depicts an example architecture of a system for processing the multi-channel image data via a first portion of an ML model and processing intermediate input data via second portion of the ML model and concatenating the results to further process the data.

FIG. 3B depicts an example architecture 320 of a system for processing the multi-channel image data via a first portion of an ML model and processing intermediate input data via second portion of the ML model and concatenating the results to further process the data.

As illustrated, backbone input features 302, such as multi-channel image data, may be input into a backbone 304, or a feature extraction component, of a neural network. In some examples, the multi-channel image data may comprise N-channels, where N may be any integer corresponding to a number of features associated with sensor data. The N-channels of the multi-channel image data may then be split into two subsets of channels based on the feature data. For example, the N-channels may be split into first A-channels, where A may be any integer corresponding to a number of spatial features represented by the feature data, and second B-channels, where B may be any integer corresponding to a number of non-spatial features represented by the feature data.

As previously mentioned, the backbone 304 may be configured in various ways, such that, depending on the configuration of the backbone 304, the backbone input features 302 may be transformed into dense backbone features 306. In some examples, the dense backbone features 306 may comprise a dense representation (or a collection of values) of the features associated with the first A-channels of the multi-channel image data. In some examples, the dense representation of the features may comprise a feature vector associated with a pixel represented in the multi-channel image data.

The dense backbone features 306 may then undergo a masking 322 operation to determine a feature-map per entity (object) 324. In some examples, a single-channel image may be utilized to mask to the dense backbone features and detect one or more entities. In some examples, a renderer may generate a single-channel image including an indication of a center of an entity (or respective centers of each entity) included in the image. The single-channel image may also include indications of occupancy associated with the entity in the environment. For example, the single-channel image may be aligned with, or otherwise mask, the dense backbone features 306, to provide an indication of occupancy with respect to the dense backbone features 306. Wherever there is not an indication of occupancy in the dense backbone features 306, the corresponding feature vector may be ignored, and wherever there is an indication of occupancy in the dense backbone features 306 the corresponding feature vector may be collected. The collected feature vectors corresponding to a single entity may be aggregated to determine a single feature vector associated with the entity, and the single feature vector may be represented at the center of the entity. All of the feature vectors per entity may be included in the feature-map per entity 324.

In some examples, a sparse renderer 326, may be configured to generate additional feature data, representing additional features per entity 328, based on the sensor data corresponding to specific features, such as, for example, the second B-channels representing the non-spatial features. The additional features per entity 328 may comprise a plurality of features per entity represented by the sensor data. In some examples, the additional features per entity may be configured as a feature vector associated with an entity.

In some examples, a per feature concatenation operation may be performed. For example, each feature vector represented at a graphical reference corresponding to a location of the object in the multi-channel image data, such as, for example, the center of an entity included in the feature-map per entity 324 may be concatenated with the additional features per entity 328 (i.e., concatenating the feature vector associated with the entity with the additional feature vector associated with the entity) to determine per entity feature concatenation data 330. The per entity feature concatenation data 330 may then be input into a dense neural network, such as, for example, a Deep Neural Network (DNN) on a per entity basis. The per entity feature concatenated data 330 may be passed through the dense network per entity 332, which may process the per entity feature concatenation data 330 to determine a plurality of logits per entity 310 included in the environment.

Figure 4:
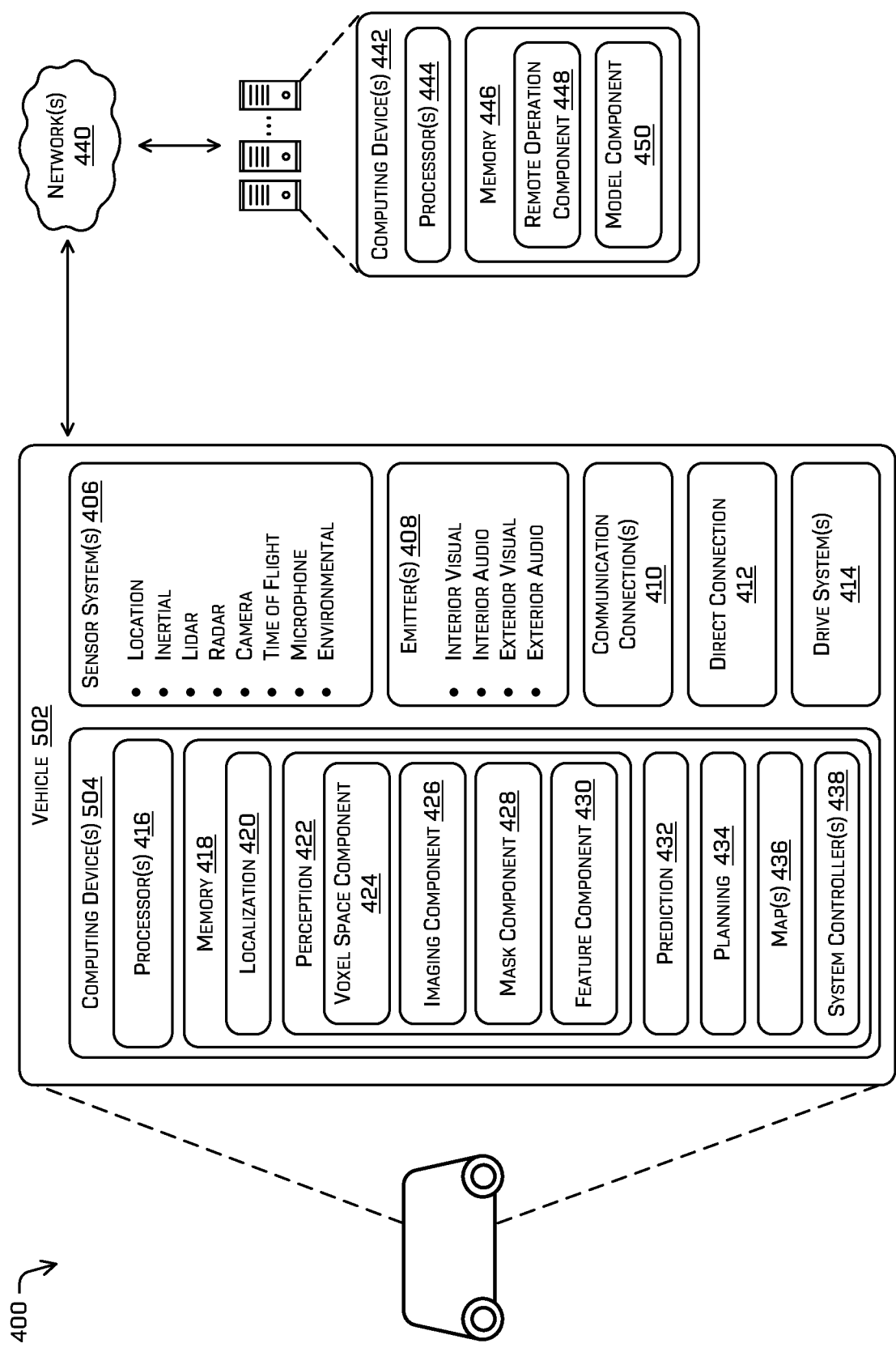
FIG. 4 is a block diagram of an example system for implementing the techniques described herein.

FIG. 4 is a block diagram of an example system 400 for implementing the techniques described herein. In at least one example, the system 400 may include a vehicle 402. In the illustrated example system 400, the vehicle 402 is an autonomous vehicle; however, the vehicle 402 may be any other type of vehicle.

The vehicle 402 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 may be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 402 may include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 may be configured to capture sensor data associated with an environment.

The one or more sensor system(s) 406 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 406 may include multiple instances of each of these or other types of sensors. For instance, the time-of-flight sensors may include individual time-of-flight sensors located at the corners, front, back, sides, and/or top of the vehicle 402. As another example, the camera sensors may include multiple cameras disposed at various locations about the exterior and/or interior of the vehicle 402. The one or more sensor system(s) 406 may provide input to the computing device 404.

The vehicle 402 may also include one or more emitter(s) 408 for emitting light and/or sound. The one or more emitter(s) 408 in this example include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 may also include one or more communication connection(s) 410 that enable communication between the vehicle 402 and one or more other local or remote computing device(s) (e.g., a remote teleoperation computing device) or remote services. For instance, the one or more communication connection(s) 410 may facilitate communication with other local computing device(s) on the vehicle 402 and/or the one or more drive system(s) 414. Also, the one or more communication connection(s) 410 may allow the vehicle 402 to communicate with other nearby computing device(s) (e.g., other nearby vehicles, traffic signals, etc.).

The one or more communications connection(s) 410 may include physical and/or logical interfaces for connecting the computing device 404 to another computing device or one or more external networks 440 (e.g., the Internet). For example, the one or more communications connection(s) 410 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 may include one or more drive system(s) 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor system(s) 406 to detect conditions of the drive system(s) 414 and/or the surroundings of the vehicle 402. By way of example and not limitation, the sensor system(s) 406 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 414. In some cases, the sensor system(s) 406 on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive system controller which may receive and preprocess data from the sensor system(s) 406 and to control operation of the various vehicle systems. In some examples, the drive system controller may include one or more processor(s) and memory communicatively coupled with the one or more processor(s). The memory may store one or more components to perform various functionalities of the drive system(s) 414. Furthermore, the drive system(s) 414 also include one or more communication connection(s) that enable communication by the respective drive system with one or more other local or remote computing device(s).

The computing device 404 may include one or more processor(s) 416 and memory 418 communicatively coupled with the one or more processor(s) 416. In the illustrated example, the memory 418 of the computing device 404 stores a localization component 420, a perception component 422 comprising a voxel space component 424, an imaging component 426, a prediction component 432, a planning component 434, a maps component 436, and one or more system controller(s) 438. Though depicted as residing in the memory 418 for illustrative purposes, it is contemplated that the localization component 420, the perception component 422, the voxel space component 424, the imaging component 426, the mask component 428, the feature component 430, the prediction component 432, the planning component 434, the maps component 436, and the one or more system controller(s) 438 may additionally, or alternatively, be accessible to the computing device 404 (e.g., stored in a different component of vehicle 402) and/or be accessible to the vehicle 402 (e.g., stored remotely).

In memory 418 of the computing device 404, the localization component 420 may include functionality to receive data from the sensor system(s) 406 to determine a position of the vehicle 402. For example, the localization component 420 may include and/or request/receive a three-dimensional map of an environment and may continuously determine a location of the autonomous vehicle within the map. In some examples, the localization component 420 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some examples, the localization component 420 may provide data to various components of the vehicle 402 to determine an initial position of an autonomous vehicle for generating a trajectory, as discussed herein.

The perception component 422 may include functionality to perform object detection, segmentation, and/or classification. In some examples, the perception component 422 may provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 422 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

As described above, the perception component 422 may use perception algorithms to determine a perception-based bounding box associated with an object in the environment based on sensor data. For example, the perception component 422 may receive image data and classify the image data to determine that an object is represented in the image data. Then, using detection algorithms, the perception component 422 may generate a two-dimensional bounding box and/or a perception-based three-dimensional bounding box associated with the object. The perception component 422 may further generate a three-dimensional bounding box associated with the object. As discussed above, the three-dimensional bounding box may provide additional information such as a location, orientation, pose, and/or size (e.g., length, width, height, etc.) associated with the object.

The perception component 422 may include functionality to store perception data generated by the perception component 422. In some examples, the perception component 422 may determine a track corresponding to an object that has been classified as an object type. For purposes of illustration only, the perception component 422, using sensor system(s) 406 may capture one or more images of an environment. The sensor system(s) 406 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The voxel space component 424 may include functionality to receive sensor data and associate the sensor data with one or more voxel spaces, as a multi-resolution voxel space, where the voxel space comprising, in some examples, three dimensions. In some examples, the voxel space component 424 may include functionality to statistically accumulate sensor data and process the sensor as it is associated with individual voxels. In other instances, the voxel space component 424 may include functionality to associate the sensor data with a voxel space as raw sensor data (e.g., with individual <x, y, z, range, time, etc.> values associated with data points).

The imaging component 426 may include functionality to determine a top-down representation (or a representation from any view) of a multi-resolution voxel space. Additionally, or alternatively, the imaging component 426 may include functionality to determine multi-resolution multi-channel image data for input into a first portion of the ML model. For example, the imaging component 426 may include functionality to render the multi-channel input blobs 244, 254, and 264 for input into various ML models 246, 256, and 266, respectively, as previously described with respect to FIG. 2B. Additionally, or alternatively, the imaging component may be configured to render various input data for input at various portions of an ML model.

The mask component 428 may include functionality to generate a single-channel image including an indication of a center of an object (or respective centers of each object) included in an image of an environment. Additionally, or alternatively, the mask component 428 may include functionality to mask some input data, such as, for example, multi-channel image data comprising one or more feature vectors, to provide an indication of occupancy with respect to the input data.

The feature component 430 may include functionality to aggregate feature vectors corresponding to pixels of an image representing an environment. For example, one or more pixels may be associated with an object, and features vectors corresponding to the one or more pixels associated with the object may be aggregated to determine a single feature vector associated with the object. Additionally, or alternatively, the feature component 430 may include functionality to concatenate the feature vector associated with the object with an additional feature vector representing one or more additional features per object to determine intermediate input data to be input to a second portion of the ML model.

The prediction component 432 may generate one or more probability maps representing prediction probabilities of possible locations of one or more objects in an environment. For example, the prediction component 432 may generate one or more probability maps for vehicles, pedestrians, animals, and the like within a threshold distance from the vehicle 402. In some examples, the prediction component 432 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment.

The planning component 434 may determine a path for the vehicle 402 to follow to traverse through an environment. For example, the planning component 434 may determine various routes and paths and various levels of detail. In some examples, the planning component 434 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 434 may generate an instruction for guiding the autonomous vehicle along at least a portion of the route from the first location to the second location. In at least one example, the planning component 434 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 434 may alternatively, or additionally, use data from the perception component 422 and/or the prediction component 432 to determine a path for the vehicle 402 to follow to traverse through an environment. For example, the planning component 434 may receive data from the perception component 422 and/or the prediction component 432 regarding objects associated with an environment. Using this data, the planning component 434 may determine a route to travel from a first location (e.g., a current location) to a second location (e.g., a target location) to avoid objects in an environment. In at least some examples, such a planning component 434 may determine there is no such collision free path and, in turn, provide a path which brings vehicle 402 to a safe stop avoiding all collisions and/or otherwise mitigating damage.

The memory 418 may further include one or more maps 436 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some examples, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed, as discussed herein. In at least one example, the one or more maps 436 may include at least one map (e.g., images and/or a mesh). In some examples, the vehicle 402 may be controlled based at least in part on the map(s) 436. That is, the map(s) 436 may be used in connection with the localization component 420, the perception component 422 (and sub-components), the prediction component 432, and/or the planning component 434 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 may include one or more system controller(s) 438, which may be configured to control steering, propulsion, braking, safety, emitters, communication, and other systems of the vehicle 402. These system controller(s) 438 may communicate with and/or control corresponding systems of the drive system(s) 414 and/or other components of the vehicle 402, which may be configured to operate in accordance with a path provided from the planning component 434.

The vehicle 402 may connect to computing device(s) 442 via network 440 and may include one or more processor(s) 444 and memory 446 communicatively coupled with the one or more processor(s) 444. In at least one instance, the one or more processor(s) 444 may be similar to the processor(s) 416 and the memory 446 may be similar to the memory 418. In the illustrated example, the memory 446 of the computing device(s) 442 stores a remote operation component 448 and/or a model component 450. In at least one instance, the model component 450, after empirical testing and/or simulations, may generate ML models to be used by the perception component 422, as discussed herein. Though depicted as residing in the memory 446 for illustrative purposes, it is contemplated that the remote operation component 448 and the model component 450 may additionally, or alternatively, be accessible to the computing device(s) 442 (e.g., stored in a different component of computing device(s) 442 and/or be accessible to the computing device(s) 442 (e.g., stored remotely).

The model component 450 may include functionality to generate models for determining segmentation information, classification information, etc. for multi-channel image data, as discussed herein.

The processor(s) 416 of the computing device 404 and the processor(s) 444 of the computing device(s) 442 may be any suitable processor capable of executing instructions to process data and perform operations as described herein. By way of example and not limitation, the processor(s) 416 and 444 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 418 computing device 404 and the memory 446 of the computing device(s) 442 are examples of non-transitory computer-readable media. The memory 418 and 446 may store an operating system and one or more software applications, instructions, programs, and/or data to implement the methods described herein and the functions attributed to the various systems. In various implementations, the memory 418 and 446 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, aspects of some or all of the components discussed herein may include any models, algorithms, and/or machine-learning algorithms. For example, in some examples, the components in the memory 418 and 446 may be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

Figure 5:
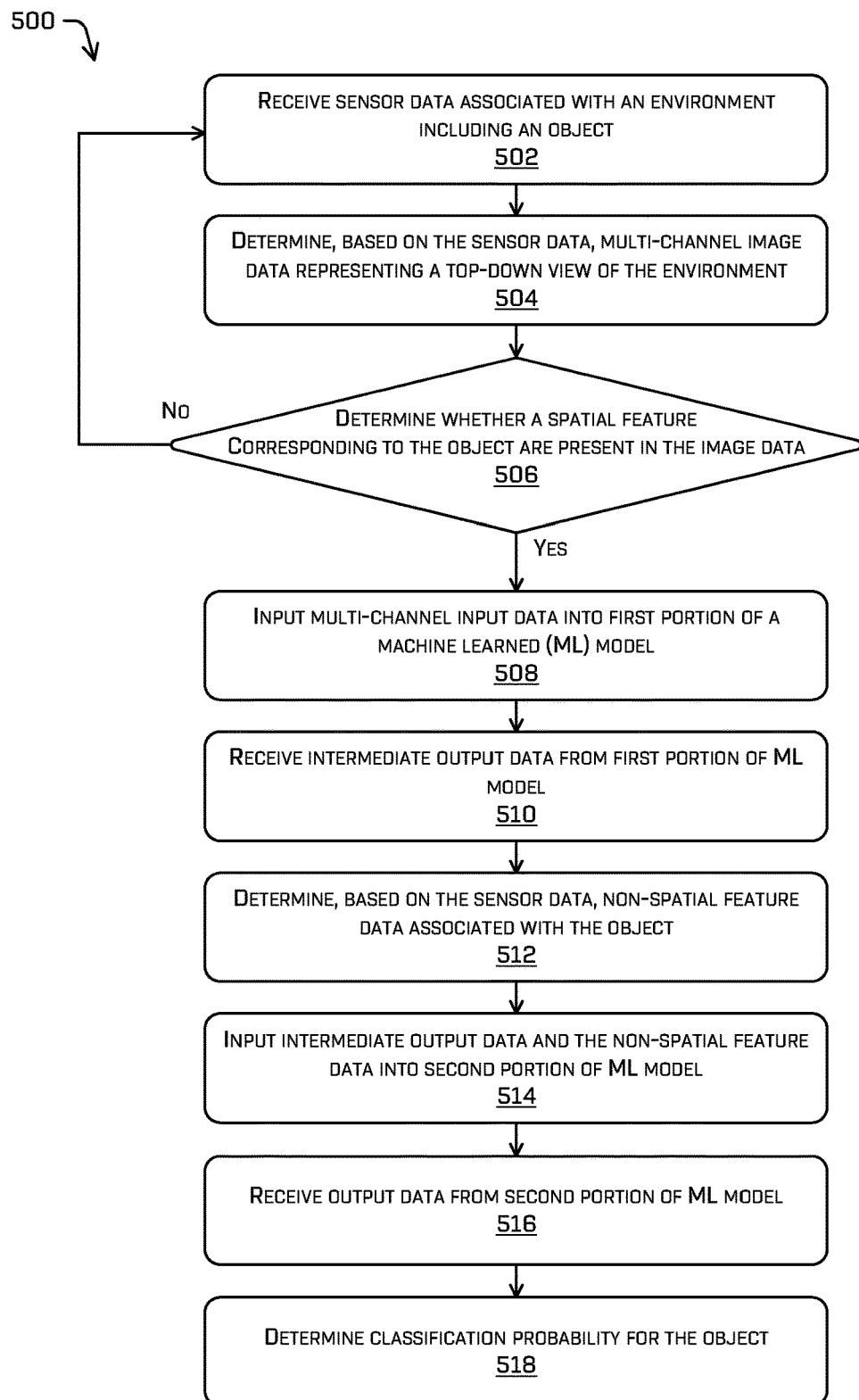
FIG. 5 is an example process for inputting input data into a first portion of a machine-learned (ML) model, inputting intermediate input data into a second portion of the ML model, and determining a classification probability of an object in an environment based on the output data from the first and second portion of the ML model.
Figure 6:
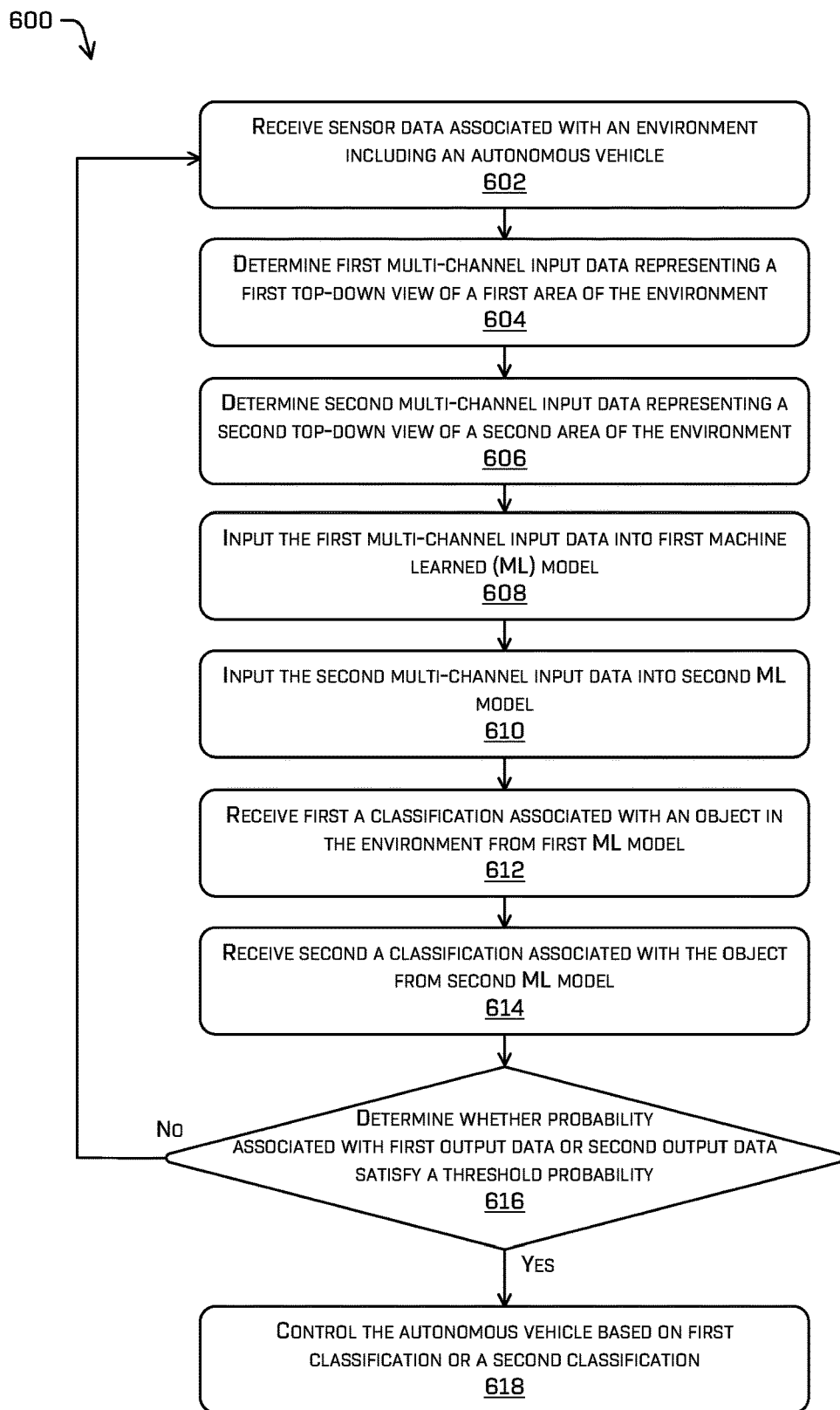
FIG. 6 is an example process for inputting first input data into a first ML model, inputting second input data into a second ML model, receiving a first classification associated with an object from the first ML model, receiving a second classification associated with an object from the second ML model, and controlling an autonomous vehicle based on the first classification or the second classification.

FIGS. 1, 5, and 6 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 is an example process 500 for inputting input data into a first portion of a machine-learned (ML) model, inputting intermediate input data into a second portion of the ML model, and determining a classification probability of an object in an environment based on the output data from the first and second portion of the ML model. For example, some or all of the process 500 may be performed by one or more components in FIG. 4, as described herein. For example, some or all of the process 500 may be performed by the voxel space component 424, the imaging component 426, the mask component 428, and/or the feature component 430.

At operation 502, the process 500 may include receiving sensor data of an environment. In some examples, the operation 502 may include receiving and/or capturing time of flight data, lidar data, image data, radar data, and the like, of an environment. In some examples, the operation 502 may be performed by a vehicle (e.g., an autonomous vehicle) as the vehicle traverses the environment. In some examples, the environment may include an object, and the sensor data may include an indication of the object in the environment.

At operation 504, the process 500 may include determining multi-channel image data representing a top-down view of the environment. In some examples, the multi-channel image data may be based on the sensor data. In some examples, the multi-channel image data may correspond to the multi-channel image data 114. In some examples, the multi-channel image data may include image data associated with a spatial feature corresponding to the object in the environment.

At operation 506, the process 500 may include determining whether a spatial feature corresponding to the object are present in the image data. By way of example, the operation 506 may include determining that a spatial feature is present in the multi-channel image data. Additionally, or alternatively, the operation 506 may include determining that an object is present in the image data. By way of another example, the operation 506 may include determining that a spatial feature and/or an object is not present in the image data. The process may subsequently include the operation

502 to restart the process, based on determining that a spatial feature and/or an object is not present in the image data.

At operation 508, the process 500 may include inputting the multi-channel image data into a first portion of a machine-learned (ML) model. In some examples, the first portion of the ML model may be configured as a backbone, or a feature extraction component, of a neural network, such as, for example, a Convolutional Neural Network (CNN). The first portion of the ML model may process the multi-channel image data and determine intermediate output data corresponding to the multi-channel image data.

At operation 510, the process 500 may include receiving intermediate output data from the first portion of the ML model. In some examples, the intermediate output data may be based at least in part on the multi-channel image data.

At operation 512, the process 500 may include the process may include determining non-spatial feature data representing a non-spatial feature associated with the object. In some examples, the non-spatial feature data may be based at least in part on the sensor data. Additionally, or alternatively, the non-spatial feature data may be associated with a non-spatial feature associated with the object. In some examples, the non-spatial feature data may correspond to the features 136.

At operation 514, the process 500 may include inputting the intermediate output data and the non-spatial feature data into a second portion of the ML model. In some examples, the second portion of the ML model may be configured as a dense neural network, such as, for example, a Deep Neural Network (DNN). The intermediate output data and/or the spatial feature data may be transformed, or otherwise concatenated, and passed through the second portion of the ML model on a per-object basis, and the second portion of the ML model may process the intermediate output data and/or the non-spatial feature data and determine output data representing a plurality of logits per object.

At operation 516, the process 500 may include receiving output data from the second portion of the ML model. In some examples, the output data may be based at least in part on the intermediate output data and/or the non-spatial feature data. In some examples, the output data may represent a plurality of logits (e.g., a function that represents probability values from 0, or negative infinity, to 1, or infinity) per object in the environment.

At operation 518, the process 500 may include determining a classification probability for the object. In some examples, the classification probability may be based at least in part on the output data received from the second portion of the ML model. In some examples, the classification probability may be based at least in part on the logits per object represented by the output data. In some examples, the classification probability may indicate at least one of an object type classification (e.g., vehicle, pedestrian, bicycle, etc.), an object behavior classification (e.g., assertive, normal, evasive, aggressive, etc.), an object gaze classification (e.g., a distracted pedestrian, an alert pedestrian, etc.), an object trajectory classification (e.g., on road, remaining on sidewalk, jaywalking, etc.), a lane change classification (e.g., changing lanes into my lane), and/or an emergency vehicle classification.

FIG. 6 is an example process 600 for inputting first input data into a first ML model, inputting second input data into a second ML model, receiving a first classification associated with an object from the first ML model, receiving a second classification associated with an object from the second ML model, and controlling an autonomous vehicle based on the first classification or the second classification. For example, some or all of the process 600 may be performed by one or more components in FIG. 4, as described herein. For example, some or all of the process 600 may be performed by the voxel space component 424, the imaging component 426, the mask component 428, and/or the feature component 430.

At operation 602, the process 600 may include receiving sensor data of an environment. In some examples, the operation 502 may include receiving and/or capturing time of flight data, lidar data, image data, radar data, and the like, of an environment. In some examples, the operation 502 may be performed by a vehicle (e.g., an autonomous vehicle) as the vehicle traverses the environment.

At operation 604, the process 600 may include determining first multi-channel image data representing a first top-down view of a first area of the environment. In some examples, the first multi-channel image data may be based on the sensor data. In some examples, the multi-channel image data may correspond to the multi-channel image data 114.

At operation 606, the process 600 may include determining second multi-channel image data representing a second top-down view of a second area of the environment. In some examples, the second multi-channel image data may be based on the sensor data. In some examples, the second multi-channel image data may correspond to the multi-channel image data 114. In some examples, the second area of the environment may be greater than the first area. In some examples, the second multi-channel input data may have a resolution that is lower than a resolution of the first multi-channel input data.

At operation 608, the process 600 may include inputting the first multi-channel image data into a first machine-learned (ML) model. In some examples, the first ML model may correspond to any one of the processing pipelines 240, 250, or 260, as previously described with respect to FIG. 2B. In some examples, the first ML model may comprise a first portion and a second portion. In some examples, the first portion of the first ML model may be configured as a backbone, or a feature extraction component, of a neural network, such as, for example, a Convolutional Neural Network (CNN). Additionally, or alternatively, the second portion of the first ML model may be configured as a dense neural network, such as, for example, a Deep Neural Network (DNN).

At operation 610, the process 600 may include inputting the second multi-channel image data into a second machine-learned (ML) model. In some examples, the second ML model may correspond to any one of the processing pipelines 240, 250, or 260, as previously described with respect to FIG. 2B. In some examples, the second ML model may comprise a first portion and a second portion. In some examples, the first portion of the second ML model may be configured as a backbone, or a feature extraction component, of a neural network, such as, for example, a Convolutional Neural Network (CNN). Additionally, or alternatively, the second portion of the second ML model may be configured as a dense neural network, such as, for example, a Deep Neural Network (DNN).

At operation 612, the process 600 may include receiving first output data from the first ML model. In some examples, the first output data may comprise a first classification associated with an object in the environment. In some examples, the first output data may be based on a plurality of logits (e.g., a function that represents probability values from 0, or negative infinity, to 1, or infinity) per object in the environment. Additionally, or alternatively, the first output data may correspond to at least a portion of any of the logits for entities 248, 258, or 268, as previously described with respect to FIG. 2B.

At operation 614, the process 600 may include receiving second output data from the second ML model. In some examples, the second output data may comprise a second classification associated with the object in the environment. In some examples, the second output data may be based on a plurality of logits (e.g., a function that represents probability values from 0, or negative infinity, to 1, or infinity) per object in the environment. Additionally, or alternatively, the second output data may correspond to at least a portion of any of the logits for entities 248, 258, or 268, as previously described with respect to FIG. 2B.

At operation 616, the process 600 may include determining whether a first probability associated with the first classification or a second probability associated with the second classification satisfy a threshold probability. By way of example, the operation 616 may include determining that at least one of the first probability or the second probability satisfy the threshold probability and may control an autonomous vehicle based on the first classification or the second classification. By way of another example, the operation 616 may include determining that both the first probability and the second probability do not satisfy the threshold probability. The process 600 may subsequently include the operation 602 to restart the process, based on determining that both the first probability and the second probability do not satisfy the threshold probability.

At operation 618, the process 600 may include controlling a vehicle based at least in part on the object. In some examples, the operation 618 may include generating a trajectory to stop the vehicle or to otherwise control the vehicle to safely traverse the environment. In some examples, the operation 618 may include modifying a candidate trajectory based on detected objects, for example, to determine a modified trajectory for the vehicle to follow in the environment.

EXAMPLE CLAUSES

A. A system comprising: one or more processors; and one or more non-transitory computer-readable media storing instructions executable by one or more processors, wherein the instructions, when executed, cause the system to perform operations comprising: receiving sensor data from a sensor associated with an environment including an object; determining, based at least in part on the sensor data, multi-channel image data representing a top-down view of the environment, the multi-channel image data including image data associated with a spatial feature corresponding to the object; inputting the multi-channel input data into a first portion of a machine learned (ML) model; receiving, as an intermediate output, intermediate output data from the first portion of the ML model wherein the intermediate output data includes the spatial feature encoded as being associated with the object; determining, based at least in part on the sensor data, non-spatial feature data representing a non-spatial feature associated with the object; inputting the intermediate output data and the non-spatial feature data into a second portion of the ML model; receiving output data from the second portion of the ML model; and determining a classification probability for the object based at least in part on the output data.

B. The system of paragraph A, wherein: the spatial feature comprises at least one of: map information associated with the environment; a bounding box associated with the object; or a size associated with the object; and the non-spatial feature comprises at least one of: a velocity associated with the object; an acceleration associated with the object; or a lighting state associated with the object.

C. The system of any one of paragraphs A or B, wherein the classification probability comprises at least one of: an object type classification; an object behavior classification; an object gaze classification; an object trajectory classification; a lane change classification; or an emergency vehicle classification.

D. The system of any one of paragraphs A-C, further comprising determining a graphical reference corresponding to a corresponding location of the object within the multi-channel image data, wherein the spatial feature is encoded as being associated with the object based at least in part on the graphical reference.

E. The system of any one of paragraphs A-D, wherein the first portion of the ML model comprises a Convolutional Neural Network (CNN) and the second portion of the ML model comprises a Deep Neural Network (DNN).

F. A method comprising: receiving sensor data from a sensor associated with an environment including an object; determining, based at least in part on the sensor data, spatial data representing the environment; inputting the spatial data into a first portion of a machine learned (ML) model; receiving intermediate data from the first portion of the ML model, wherein the intermediate data includes spatial feature data corresponding to a spatial feature encoded as being associated with the object; determining, based at least in part on the sensor data, secondary feature data corresponding to a feature associated with the object; inputting the spatial feature data and the secondary feature data into a second portion of the ML model; and determining a classification probability of the object based at least in part on data received from the second portion of the ML model.

G. The method of paragraph F, wherein: the spatial feature comprises at least one of: map information associated with the environment; a bounding box associated with the object; or a size associated with the object; and the feature comprises at least one of: a velocity associated with the object; an acceleration associated with the object; or a lighting state associated with the object.

H. The method of paragraph G, wherein the spatial data represents a top-down view of the environment.

I. The method of any one of paragraphs F-H, further comprising: determining a mask identifying a corresponding location of the object in the spatial data; and determining based on the mask and the spatial data, a feature vector associated with the object, wherein the intermediate data includes the feature vector.

J. The method of any one of paragraphs F-I, wherein the first portion of the ML model comprises a Convolutional Neural Network (CNN) and the second portion of the ML model comprises a Deep Neural Network (DNN).

K. The method of any one of paragraphs F-J, wherein the spatial data is first spatial data corresponding to a first range to an origin in the environment, wherein the ML model comprises a first ML model, and the method further comprising: determining, based at least in part on the sensor data, second spatial data wherein the spatial data corresponding to a second arrange to the origin, the first range being less than the second range; inputting the second spatial data into a second ML model configured to determine classification probabilities associated with the second range; and wherein determining the classification probability is further based at least in part on an output of the second ML model.

L. The method of any one of paragraphs F-K, further comprising: associating the sensor data with a three-dimensional voxel space representing the environment; and wherein the spatial data represents a reduced-dimensionality representation of the three-dimensional voxel space.

M. The method of any one of paragraphs F-L, further comprising receiving the sensor data from a sensor associated with an autonomous vehicle in the environment.

N. The method of any one of paragraphs F-M, further comprising controlling an autonomous vehicle based at least in part on the classification probability.

O. One or more non-transitory computer-readable media storing instructions executable by a processor, wherein the instructions, when executed, cause the processor to perform operations comprising: receiving sensor data from a sensor associated with an environment including an object; determining, based at least in part on the sensor data, spatial data representing the environment; inputting the spatial data into a first portion of a machine learned (ML) model; receiving intermediate data from the first portion of the ML model, wherein the intermediate data includes spatial feature data corresponding to a spatial feature encoded as being associated with the object; determining, base data least in part on the sensor data, secondary feature data corresponding to a feature associated with the object; inputting the spatial feature data and the secondary feature data into a second portion of the ML model; and determining a classification probability of the object based at least in part on data received from the second portion of the ML model.

P. The one or more non-transitory computer-readable media of paragraph O, wherein: the spatial feature comprises at least one of: map information associated with the environment; a bounding box associated with the object; or a size associated with the object; and the feature comprises at least one of: a velocity associated with the object; an acceleration associated with the object; or a lighting state associated with the object.

Q. The one or more non-transitory computer-readable media of paragraph P, wherein the spatial data represents a top-down view of the environment.

R. The one or more non-transitory computer-readable media of paragraph Q, wherein the spatial data includes: a first channel comprising a first spatial feature; and a second channel comprising a second spatial feature.

S. The one or more non-transitory computer-readable media of any one or paragraphs O-R, the operations further comprising: determining a mask identifying a corresponding location of the object in the spatial data; and determining based on the mask and the spatial data, a feature vector associated with the object, wherein the intermediate data includes the feature vector.

T. The one or more non-transitory computer-readable media of any one or paragraphs O-S, wherein the first portion of the ML model comprises a Convolutional Neural Network (CNN) and the second portion of the ML model comprises a Deep Neural Network (DNN).

U. A system comprising: one or more processors; and one or more non-transitory computer-readable media storing instructions executable by one or more processors, wherein the instructions, when executed, cause the system to perform operations comprising: receiving sensor data from a sensor associated with an environment including an autonomous vehicle; determining, based at least in part on the sensor data, first multi-channel input data representing a first top-down view of a first area of the environment; determining, based at least in part on the sensor data, second multi-channel input data representing a second top-down view of a second area of the environment, the second area of the environment being greater than the first area and the second multi-channel input data having a lower resolution than the first multi-channel input data; inputting the first multi-channel input data into a first machine-learned (ML) model; inputting the second multi-channel input data into a second ML model; receiving first output data from the first ML model, the first output data comprising a first classification associated with an object in the environment; receiving second output data from the second ML model, the second output data comprising a second classification associated with the object; and controlling the autonomous vehicle based at least in part on the first classification or the second classification.

V. The system of paragraph U, wherein the first area of the environment at least partially overlaps with the second area of the environment.

W. The system of any one of paragraphs U or V, the operations further comprising: determining that the object is associated with the first area of the environment; and discarding the second classification based at least on determining that the object is within the first area; wherein controlling the autonomous vehicle is based at least in part on the first classification.

X. The system of any one of paragraphs U-W, wherein a first channel of the first multi-channel input data comprises first feature data representing a feature associated with the object, and a second channel of the second multi-channel input data comprises second feature data representing the feature associated with the object.

Y. The system of any one of paragraphs U-X, wherein the first multi-channel input data represents a spatial feature and the object in the environment.

Z. A method comprising: receiving sensor data from a sensor associated with an environment; determining, based at least in part on the sensor data, first input data representing a first area of the environment; determining, based at least in part on the sensor data, second input data representing a second area of the environment, the second area of the environment being greater than the first area and the second input data representing the environment at a lower resolution than the first input data; inputting the first input data into a first machine-learned (ML) model; inputting the second input data into a second ML model; and controlling an autonomous vehicle based at least in part on a first classification associated with an object in the environment received from the first ML model, or a second classification associated with the object in the environment received from the second ML model.

AA. The method of paragraph Z, wherein the first area of the environment at least partially overlaps with the second area of the environment.

AB. The method of paragraph Z or AA, further comprising: determining that the object is associated with the first area of the environment; and discarding the second classification based at least on determining that the object is within the first area; wherein controlling the autonomous vehicle is based at least in part on the first classification.

AC. The method of any one of paragraphs Z-AB, wherein: the first input data comprises first multi-channel input data; a first channel of the first multi-channel input data comprises first feature data representing a feature associated with the object; and a second channel of the second multi-channel input data comprises second feature data representing the feature associated with the object.

AD. The method of any one of paragraphs Z-AC, wherein the first input data represents a spatial feature and the object in the environment.

AE. The method of any one of paragraphs Z-AD, further comprising determining feature data associated with the sensor data, the feature data representing features associated with the object, and wherein the first input data comprises a number of channels based at least in part on a first subset of the features.

AF. The method of any one of paragraphs Z-AE, further comprising: inputting the first input data into a first portion of the first ML model; receiving intermediate output data from the first portion of the first ML model; determining, based at least in part on a second subset of the features associated with the object and the intermediate output data, intermediate input data; inputting the intermediate input data into a second portion of the first ML model; and receiving, from the first portion of the first ML model, first output data comprising the first classification associated with the object.

AG. The method of any one of paragraphs Z-AF wherein: the first subset of the features comprises at least one of: map information associated with the environment; a bounding box associated with the object; or a size associated with the object; and a second subset of the features comprises at least one of: a velocity associated with the object; an acceleration associated with the object; or a lighting state associated with the object.

AH. The method of any one of paragraphs Z-AG, further comprising associating the sensor data with a three-dimensional voxel space representing the environment, the three-dimensional voxel space including the first area and the second area; and wherein the first input data includes voxel data corresponding to the first area within the three-dimensional voxel space.

AI. One or more non-transitory computer-readable media storing instructions executable by a processor, wherein the instructions, when executed, cause the processor to perform operations comprising: receiving sensor data from a sensor associated with an environment; determining, based at least in part on the sensor data, first input data representing a first area of the environment; determining, based at least in part on the sensor data, second input data representing a second area of the environment, the second area of the environment being greater than the first area and the second input data representing the environment at a lower resolution than the first input data; inputting the first input data into a first machine-learned (ML) model; inputting the second input data into a second ML model; and controlling an autonomous vehicle based at least in part on a first classification associated with an object in the environment received from the first ML model, or a second classification associated with the object in the environment received from the second ML model.

AJ. The one or more non-transitory computer-readable media of paragraph AI, wherein the first area of the environment at least partially overlaps with the second area of the environment.

AK. The one or more non-transitory computer-readable media of paragraph AI or AJ, the operations further comprising: determining that the object is associated with the first area of the environment; and discarding the second classification based at least on determining that the object is within the first area; wherein controlling the autonomous vehicle is based at least in part on the first classification.

AL. The one or more non-transitory computer-readable media of any one or paragraphs AI-AK, wherein: the first input data comprises first multi-channel input data; a first channel of the first multi-channel input data comprises first feature data representing a feature associated with the object; and a second channel of the second multi-channel input data comprises second feature data representing the feature associated with the object.

AM. The one or more non-transitory computer-readable media of any one or paragraphs AI-AL, wherein the first input data represents a spatial feature and the object in the environment.

AN. The one or more non-transitory computer-readable media of any one or paragraphs AI-AM, the operations further comprising determining feature data associated with the sensor data, the feature data representing features associated with the object, and wherein the first input data comprises a number of channels based at least in part on a first subset of the features.

While the example clauses described above are described with respect to one particular implementation, it should be understood that, in the context of this document, the content of the example clauses may also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:
1. A system comprising:
one or more processors; and
one or more non-transitory computer-readable media storing instructions executable by one or more processors, wherein the instructions, when executed, cause the system to perform operations comprising:
receiving sensor data from a sensor associated with an environment including an object;
determining, based at least in part on the sensor data, multi-channel image data representing a top-down view of the environment, the multi-channel image data including image data associated with a spatial feature, wherein the spatial feature comprises map information associated with the environment and at least one of a location of the object in the environ- ment, a bounding box associated with the object, or a size associated with the object;

inputting the multi-channel image data into a first portion of a machine learned (ML) model;

receiving, as an intermediate output, intermediate output data from the first portion of the ML model wherein the intermediate output data includes the spatial feature encoded as being associated with the object;

determining, based at least in part on the sensor data, non-spatial feature data representing a non-spatial feature associated with the object;

concatenating, as concatenated data, the intermediate output data with the non-spatial feature data on a per object basis;

inputting the concatenated data into a second portion of the ML model;

receiving output data from the second portion of the ML model; and determining a classification probability for the object based at least in part on the output data.

2. The system of claim 1, wherein:
the non-spatial feature comprises at least one of:
a velocity associated with the object;
an acceleration associated with the object; or
a lighting state associated with the object.

3. The system of claim 1, wherein the classification probability comprises at least one of:
an object type classification;
an object behavior classification;
an object gaze classification;
an object trajectory classification;
a lane change classification; or
an emergency vehicle classification.

4. The system of claim 1, further comprising:
determining a graphical reference corresponding to a corresponding location of the object within the multi-channel image data, wherein the spatial feature is encoded as being associated with the object based at least in part on the graphical reference.

5. The system of claim 1, wherein the first portion of the ML model comprises a Convolutional Neural Network (CNN) and the second portion of the ML model comprises a Deep Neural Network (DNN).

6. A method comprising:
receiving sensor data from a sensor associated with an environment including an object;
determining, based at least in part on the sensor data, spatial data representing the environment;
inputting the spatial data into a first portion of a machine learned (ML) model, wherein the spatial data comprises map information associated with the environment and at least one of a location of the object in the environment, a bounding box associated with the object, or a size associated with the object;
receiving intermediate data from the first portion of the ML model, wherein the intermediate data includes spatial feature data corresponding to a spatial feature encoded as being associated with the object;
determining, based at least in part on the sensor data, secondary feature data corresponding to a feature associated with the object;
concatenating, as concatenated data, the intermediate data with the secondary feature data on a per object basis;
inputting the concatenated data into a second portion of the ML model; and determining a classification probability of the object based at least in part on data received from the second portion of the ML model.

7. The method of claim 6, wherein:
the feature comprises at least one of:
a velocity associated with the object;
an acceleration associated with the object; or
a lighting state associated with the object.

8. The method of claim 7, wherein the spatial data represents a top-down view of the environment.

9. The method of claim 8, further comprising:
determining a mask identifying a corresponding location of the object in the spatial data; and
determining, based on the mask and the spatial data, a feature vector associated with the object, wherein the intermediate data includes the feature vector.

10. The method of claim 6, wherein the first portion of the ML model comprises a Convolutional Neural Network (CNN) and the second portion of the ML model comprises a Deep Neural Network (DNN).

11. The method of claim 6, wherein the spatial data is first spatial data corresponding to a first range to an origin in the environment, wherein the ML model comprises a first ML model, and the method further comprising:
determining, based at least in part on the sensor data, second spatial data, wherein the spatial data corresponds to a second range to the origin, the first range being less than the second range;
inputting the second spatial data into a second ML model configured to determine classification probabilities associated with the second range; and
wherein determining the classification probability is further based at least in part on an output of the second ML model.

12. The method of claim 6, further comprising:
associating the sensor data with a three-dimensional voxel space representing the environment; and
wherein the spatial data represents a reduced-dimensionality representation of the three-dimensional voxel space.

13. The method of claim 6, further comprising receiving the sensor data from a sensor associated with an autonomous vehicle in the environment.

14. The method of claim 6, further comprising controlling an autonomous vehicle based at least in part on the classification probability.

15. One or more non-transitory computer-readable media storing instructions executable by one or more processors, wherein the instructions, when executed, cause the one or more processors to perform operations comprising:
receiving sensor data from a sensor associated with an environment including an object;
determining, based at least in part on the sensor data, spatial data representing the environment;
inputting the spatial data into a first portion of a machine learned (ML) model, wherein the spatial data comprises map information associated with the environment and at least one of a location of the object in the environment, a bounding box associated with the object, or a size associated with the object;
receiving intermediate data from the first portion of the ML model, wherein the intermediate data includes spatial feature data corresponding to a spatial feature encoded as being associated with the object;
determining, based at least in part on the sensor data, secondary feature data corresponding to a feature associated with the object;

concatenating, as concatenated data, the intermediate data with the secondary data on a per object basis;
inputting the concatenated data into a second portion of the ML model; and
determining a classification probability of the object based at least in part on data received from the second portion of the ML model.

16. The one or more non-transitory computer-readable media of claim 15, wherein:
the feature comprises at least one of:
a velocity associated with the object;
an acceleration associated with the object; or
a lighting state associated with the object.

17. The one or more non-transitory computer-readable media of claim 16, wherein the spatial data represents a top-down view of the environment.

18. The one or more non-transitory computer-readable media of claim 17, wherein the spatial data includes:
a first channel comprising a first spatial feature; and
a second channel comprising a second spatial feature.

19. The one or more non-transitory computer-readable media of claim 15, the operations further comprising:
determining a mask identifying a corresponding location of the object in the spatial data; and
determining based on the mask and the spatial data, a feature vector associated with the object, wherein the intermediate data includes the feature vector.

20. The one or more non-transitory computer-readable media of claim 15, wherein the first portion of the ML model comprises a Convolutional Neural Network (CNN) and the second portion of the ML model comprises a Deep Neural Network (DNN).

* * * * *